US012749336B2

(12) United States Patent
Shenker et al.

(10) Patent No.: US 12,749,336 B2
(45) Date of Patent: Sep. 29, 2026

(54) SYSTEM, METHOD, AND COMPUTER PROGRAM PRODUCT FOR SENSITIVE DATA OBFUSCATION ON A CAPTURED CREDENTIAL

(71) Applicant: Visa International Service Association, San Francisco, CA (US)

(72) Inventors: Gavin Shenker, Los Angeles, CA (US); Douglas Deibert, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 845 days.

(21) Appl. No.: 17/910,495

(22) PCT Filed: Apr. 16, 2020

(86) PCT No.: PCT/US2020/028436

§ 371 (c)(1),
(2) Date: Sep. 9, 2022

(87) PCT Pub. No.: WO2021/211122

PCT Pub. Date: Oct. 21, 2021

(65) Prior Publication Data

US 2023/0133702 A1 May 4, 2023

(51) Int. Cl.

| | |
|---|---|
| ***G06V 40/16*** | (2022.01) |
| ***G06T 5/70*** | (2024.01) |
| ***G06V 10/44*** | (2022.01) |
| ***G06V 30/416*** | (2022.01) |

(52) U.S. Cl.

CPC .............. *G06V 40/161* (2022.01); *G06T 5/70* (2024.01); *G06V 10/44* (2022.01); *G06V 30/416* (2022.01)

(58) Field of Classification Search

None

See application file for complete search history.

(56) References Cited

U.S. PATENT DOCUMENTS

| | | | | |
|---|---|---|---|---|
| 8,938,116 | B2 * | 1/2015 | Kennedy | G06V 40/161 345/660 |
| 9,177,207 | B2 * | 11/2015 | Kennedy | G06V 40/161 |
| 10,095,925 | B1 * | 10/2018 | Tripuraneni | G06V 30/12 |
| 11,973,742 | B2 * | 4/2024 | Aabye | H04L 9/321 |
| 12,271,506 | B2 * | 4/2025 | Krylov | G06F 21/6254 |

(Continued)

FOREIGN PATENT DOCUMENTS

| | | | |
|---|---|---|---|
| CN | 110249586 | A | 9/2019 |
| CN | 110633576 | A | 12/2019 |

(Continued)

OTHER PUBLICATIONS

Ahmed et al., “Data Masking Best Practice”, Oracle, Jun. 2013, pp. 1-26.

(Continued)

*Primary Examiner* — Tahmina N Ansari

(74) *Attorney, Agent, or Firm* — The Webb Law Firm

(57) ABSTRACT

Provided is a computer-implemented method, system, and computer program product for obfuscating a captured credential's sensitive data. The method includes detecting, localizing, bounding, and outputting an image of the credential with the sensitive data obfuscated so that it is not human or machine readable during capture or output.

19 Claims, 12 Drawing Sheets

(56) References Cited

U.S. PATENT DOCUMENTS

| | | | | |
|---|---|---|---|---|
| 2013/0148880 | A1 * | 6/2013 | Kennedy | G06V 40/161 382/159 |
| 2013/0212026 | A1 | 8/2013 | Powell et al. | |
| 2013/0297414 | A1 * | 11/2013 | Goldfarb | G06Q 40/02 705/14.51 |
| 2014/0044303 | A1 * | 2/2014 | Chakraborti | H04N 1/00864 382/100 |
| 2016/0301686 | A1 * | 10/2016 | Mishra | H04L 63/0807 |
| 2019/0068995 | A1 | 2/2019 | Hutz et al. | |
| 2019/0188465 | A1 * | 6/2019 | Tripuraneni | G06V 30/416 |
| 2019/0392194 | A1 * | 12/2019 | Croxford | G06N 3/0464 |
| 2021/0352049 | A1 * | 11/2021 | Aabye | H04L 9/321 |
| 2023/0133702 | A1 * | 5/2023 | Shenker | G06V 30/416 382/264 |

FOREIGN PATENT DOCUMENTS

| | | | |
|---|---|---|---|
| JP | 2014238642 | A | 12/2014 |
| WO | 2019236393 | A1 | 12/2019 |
| WO | 2020046274 | A1 | 3/2020 |

OTHER PUBLICATIONS

Fernandez-Berni et al., "A QVGA Vision Sensor with Multi-functional Pixels for Focal-Plane Programmable Obfuscation", Proceedings of the International Conference on Distributed Smart Cameras, Nov. 2014, pp. 1-6.

* cited by examiner

SYSTEM, METHOD, AND COMPUTER PROGRAM PRODUCT FOR SENSITIVE DATA OBFUSCATION ON A CAPTURED CREDENTIAL

CROSS-REFERENCE TO RELATED APPLICATION

This application is the United States national phase of International Application No. PCT/US2020/028436 filed Apr. 16, 2020, the entire disclosure of which is hereby incorporated by reference in its entirety.

BACKGROUND

1. Technical Field

This disclosure relates generally to obfuscating sensitive data displayed while conducting an interaction and, in some non-limiting embodiments or aspects, to a system, method, and apparatus for obfuscating the sensitive data.

2. Technical Considerations

Increasingly personal devices and their accessories enable payment applications that use a camera to capture sensitive data needed to effect a payment interaction, such as an account holder's name, an account number, and a payment device's expiration date. The specialized payment application software may determine where the sensitive account data is located on a consumer's physical or digitally displayed payment device, e.g., a credit, debit, or prepaid card. This allows the party receiving the payment to use photo or screen capture to collect and store the sensitive data in a photo or digital library. In this way, a merchant's or peer-to-peer payment recipient's image collection device may retain sensitive, personally identifiable information that could enable an unscrupulous party to use the sensitive data to make future fraudulent interactions.

A similar risk may occur if the payment data displays on a recipient's device and a proximate third party takes a photo of, or transcribes, the sensitive data. Furthermore, while the emphasis is on payment devices, the same risks may occur in any situation where one person conveys sensitive information on a credential to another party or an unsupervised image collection device, as when a passport or driver's license is used to demonstrate proof of identity or age.

SUMMARY

Accordingly and generally, provided are an improved system, method, and apparatus for detecting and obfuscating sensitive data that may be photographically, digitally, or otherwise captured and stored in the course of a payment or other credential-based interaction. In non-limiting embodiments or aspects, provided is an improved system, method, and apparatus for obfuscating this sensitive data that can be implemented or used in a processing platform used in connection with face-to-face, remote, or online interactions or any combination thereof.

According to non-limiting embodiments or aspects, provided is a computer-implemented method for obfuscating at least one sensitive datum on at least one surface of a captured credential in the course of an interaction, the method comprising: determining, with at least one processor, whether image data associated with an interaction has the at least one sensitive datum on the at least one surface;

in response to determining that the image data has the at least one sensitive datum on the at least one surface, determining, with the at least one processor, at least one image data region occupied by the at least one sensitive datum, and applying at least one obfuscation operation to the at least one image data region, wherein the at least one obfuscation operation renders the at least one sensitive datum unreadable by a human or a machine; and generating and outputting a resulting obfuscated image of the at least one surface of the credential.

In non-limiting embodiments or aspects, determining the image data region occupied by the at least one sensitive datum comprises: locating within the image data, with the at least one processor, at least one edge of the at least one sensitive datum; and connecting the at least one edge to at least one other edge, with the at least one processor, to establish at least one boundary of the at least one sensitive datum; wherein the at least one obfuscation operation is applied to the image data bounded by at least one boundary. In non-limiting embodiments or aspects, the method further includes applying at least one face detection operation to detect and isolate the at least one sensitive datum within the image data, wherein the image data comprises a photo of a user to be obfuscated. In non-limiting embodiments or aspects, the at least one face detection operation comprises a Viola-Jones face detector, a ROC, a boost-based face detection scheme, a Haar feature extractor, a neural network solution, like a Deep Dense Face Detector, or any related operations or combinations thereof.

In non-limiting embodiments or aspects, the method further includes applying at least one OCR operation to the image data to detect and isolate the at least one sensitive datum within the image data, wherein the at least one sensitive datum comprises at least one alphanumeric character. In non-limiting embodiments or aspects, the OCR operation comprises at least one pre-processing operation, one character recognition operation, or one post-processing operation, or any combination thereof. In non-limiting embodiments or aspects, the method further includes using an edge detection algorithm to establish the at least one edge of the at least one sensitive datum and to connect the at least one of the edges of the at least one sensitive datum to establish the at least one boundary of the at least one sensitive datum.

In non-limiting embodiments or aspects, the obfuscation operation comprises blurring, masking, pixilation, or any combination thereof. In non-limiting embodiments or aspects, the at least one image data region comprises at least one of the following: at least one photo detected within the at least one image data region, at least one block of contiguous OCR isolated characters within the image data region, at least one row comprising at least one block of OCR isolated characters within the image data region, or any combination thereof. In non-limiting embodiments or aspects, performing the image processing operation comprises at least one of the following: performing a subsampling operation on the image data; performing an image segmentation locating the at least one sensitive datum; performing an edge detection operation on the image data containing the at least one sensitive datum; performing an operation that bounds the at least one sensitive datum; performing at least one face detection operation on the image data; performing at least one OCR operation on the image data; performing at least one blurring operation on the image data containing the at least one sensitive datum; performing at least one masking operation on the image data containing the at least one sensitive datum; performing at least one pixelation operation on the image data containing the at least one sensitive datum; performing at least on image generation and/or output operation; or any combination thereof.

According to non-limiting embodiments or aspects, provided is a system for obfuscating at least one sensitive datum on at least one surface of a captured credential in the course of an interaction, the system comprising at least one processor, wherein the at least one processor is programmed or configured for: determining whether image data associated with the credential has at least one sensitive datum on the at least one surface; in response to determining that the image data has the at least one sensitive datum on the at least one surface, applying at least one obfuscation operation to the at least one sensitive datum, wherein the at least one obfuscation operation renders the at least one sensitive datum unreadable by a human or a machine; and generating and outputting a resulting obfuscated image of the at least one surface of the credential.

In non-limiting embodiments or aspects, the at least one processor is further programmed or configured for: determining the image data region occupied by the at least one sensitive datum by locating within the image data the location of at least one edge of the at least one sensitive datum; connecting the at least one edge comprising the perimeter of the at least one sensitive datum to establish a boundary of the at least one sensitive datum; applying the at least one obfuscation operation to the image data bounded by the established boundary; and generating and output a resulting obfuscated image of the at least one surface of the credential for storage, display or any combination thereof. In non-limiting embodiments or aspects, the at least one processor is further programmed or configured to apply at least one face detection operation to detect and isolate the at least one sensitive datum within the image data that may be a photo of a user to be obfuscated. In non-limiting embodiments or aspects, the at least one face detection operation comprises Viola-Jones face detector, a ROC, a boost-based face detection scheme, a Haar feature extractor, a neural network solution, like a Deep Dense Face Detector, or any related operation or combination thereof.

In non-limiting embodiments or aspects, the at least one processor is further programmed or configured for applying at least one OCR operation to the image data to detect and isolate the at least one sensitive datum within the image data that comprises at least one alphanumeric character. In non-limiting embodiments or aspects, the OCR operation comprises at least one pre-processing operation, one character recognition operation, or one post-processing operation, or any combination thereof. In non-limiting embodiments or aspects, the at least one processor is programmed or configured for establishing the at least one edge of the at least one sensitive datum and to connect the at least one edge of the at least one sensitive datum to establish the at least one boundary of the at least one sensitive datum. In non-limiting embodiments or aspects, the at least one processor is programmed or configured for applying at least one obfuscation operation comprising blurring, masking, pixilation, or any combination thereof. In non-limiting embodiments or aspects, the at least one processor is programmed or configured for isolating the at least one image data region within the image data to be obfuscated that comprises the at least one boundary within the at least one image data region that comprises the at least one photo detected within the at least one image data region, or the at least one block of contiguous OCR isolated characters within the image data region, or at least one row comprising at least one block of OCR isolated characters within the image data region, or any combination thereof.

In non-limiting embodiments or aspects, the at least one processor is programmed or configured to perform image processing operations comprising at least one of the following: performing a subsampling operation on the image data; performing an image segmentation locating the at least one sensitive datum; performing an edge detection operation on the image data containing the at least one sensitive datum; performing at least one operation that bounds the at least one sensitive datum; performing at least one face detection operation on the image data; performing at least one OCR operation on the image data; performing at least one blurring operation on the image data containing the at least one sensitive datum; performing a at least one masking operation on the image data containing the at least one sensitive datum; performing at least one pixelation operation on the image data containing the at least one sensitive datum; performing at least on image generation and/or output operation; or any combination thereof.

Further non-limiting embodiments or aspects are set forth in the following numbered clauses:

Clause 1: A computer-implemented method for obfuscating at least one sensitive datum on at least one surface of a captured credential in the course of an interaction, the method comprising: determining, with at least one processor, whether image data associated with an interaction has the at least one sensitive datum on the at least one surface; in response to determining that the image data has the at least one sensitive datum on the at least one surface, determining, with the at least one processor, at least one image data region occupied by the at least one sensitive datum, and applying at least one obfuscation operation to the at least one image data region, wherein the at least one obfuscation operation renders the at least one sensitive datum unreadable by a human or a machine; and generating and outputting a resulting obfuscated image of the at least one surface of the credential.

Clause 2: The computer-implemented method of clause 1, wherein determining the image data region occupied by the at least one sensitive datum comprises: locating within the image data, with the at least one processor, at least one edge of the at least one sensitive datum; and connecting the at least one edge to at least one other edge, with the at least one processor, to establish at least one boundary of the at least one sensitive datum; wherein the at least one obfuscation operation is applied to the image data bounded by at least one boundary.

Clause 3: The computer-implemented method of clauses 1 or 2, further comprising applying at least one face detection operation to detect and isolate the at least one sensitive datum within the image data, wherein the image data comprises a photo of a user to be obfuscated.

Clause 4: The computer-implemented method of any of clauses 1-3, wherein the at least one face detection operation comprises at least one of the following: a Viola-Jones face detector, a ROC, a boost-based face detection scheme, a Haar feature extractor, a neural network solution, like a Deep Dense Face Detector, or any related operations, or any combination thereof.

Clause 5: The computer-implemented method of any of clauses 1-4, further comprising applying at least one OCR operation to the image data to detect and isolate the at least one sensitive datum within the image data, wherein the at least one sensitive datum comprises at least one alphanumeric character.

Clause 6: The computer-implemented method of any of clauses 1-5, wherein the OCR operation comprises at least one of the following: a pre-processing operation, a character recognition operation, a post-processing operation, or any combination thereof.

Clause 7: The computer-implemented method of any of clauses 1-6, further comprising using an edge detection algorithm to establish the at least one edge of the at least one sensitive datum and to connect the at least one of the edges of the at least one sensitive datum to establish the at least one boundary of the at least one sensitive datum.

Clause 8: The computer-implemented method of any of clauses 1-7, wherein the obfuscation operation comprises at least one of the following: blurring, masking, pixilation, or any combination thereof.

Clause 9: The computer-implemented method of any of clauses 1-8, wherein the at least one image data region comprises at least one of the following: at least one photo detected within the at least one image data region, at least one block of contiguous OCR isolated characters within the image data region, at least one row comprising at least one block of OCR isolated characters within the image data region, or any combination thereof.

Clause 10: The computer-implemented method of any of clauses 1-9, wherein performing the image processing operation comprises at least one of the following: performing a subsampling operation on the image data; performing an image segmentation locating the at least one sensitive datum; performing an edge detection operation on the image data containing the at least one sensitive datum; performing an operation that bounds the at least one sensitive datum; performing at least one face detection operation on the image data; performing at least one OCR operation on the image data; performing at least one blurring operation on the image data containing the at least one sensitive datum; performing at least one masking operation on the image data containing the at least one sensitive datum; performing at least one pixelation operation on the image data containing the at least one sensitive datum; performing at least on image generation and/or output operation; or any combination thereof.

Clause 11: A system for obfuscating at least one sensitive datum on at least one surface of a captured credential in the course of an interaction, the system comprising at least one processor, wherein the at least one processor is programmed or configured for: determining whether image data associated with the credential has at least one sensitive datum on the at least one surface; in response to determining that the image data has the at least one sensitive datum on the at least one surface, applying at least one obfuscation operation to the at least one sensitive datum, wherein the at least one obfuscation operation renders the at least one sensitive datum unreadable by a human or a machine; and generating and outputting a resulting obfuscated image of the at least one surface of the credential.

Clause 12: The system of clause 11, wherein the at least one processor is further programmed or configured for: determining the image data region occupied by the at least one sensitive datum by locating within the image data the location of at least one edge of the at least one sensitive datum; connecting the at least one edge comprising the perimeter of the at least one sensitive datum to establish a boundary of the at least one sensitive datum; applying the at least one obfuscation operation to the image data bounded by the established boundary; and generating and output a resulting obfuscated image of the at least one surface of the credential for storage, display or any combination thereof.

Clause 13: The system of clauses 11 or 12, wherein the at least one processor is further programmed or configured to apply at least one face detection operation to detect and isolate the at least one sensitive datum within the image data that may be a photo of a user to be obfuscated.

Clause 14: The system of any of clauses 11-13, wherein the at least one face detection operation comprises at least one of the following: Viola-Jones face detector, a ROC, a boost-based face detection scheme, a Haar feature extractor, a neural network solution, like a Deep Dense Face Detector, or any related operation, or any combination thereof.

Clause 15: The system of any of clauses 11-14, wherein the at least one processor is further programmed or configured for applying at least one OCR operation to the image data to detect and isolate the at least one sensitive datum within the image data that comprises at least one alphanumeric character.

Clause 16: The system of any of clauses 11-15, wherein the OCR operation comprises at least one of the following: a pre-processing operation, a character recognition operation, a post-processing operation, or any combination thereof.

Clause 17: The system of any of clauses 11-16, wherein the at least one processor is programmed or configured for establishing the at least one edge of the at least one sensitive datum and to connect the at least one edge of the at least one sensitive datum to establish the at least one boundary of the at least one sensitive datum.

Clause 18: The system of any of clauses 11-17, wherein the at least one processor is programmed or configured for applying at least one obfuscation operation comprising at least one of the following: blurring, masking, pixilation, or any combination thereof.

Clause 19: The system of any of clauses 11-18, wherein the at least one processor is programmed or configured for isolating the at least one image data region within the image data to be obfuscated that comprises the at least one boundary within the at least one image data region that comprises the at least one photo detected within the at least one image data region, or the at least one block of contiguous OCR isolated characters within the image data region, or at least one row comprising at least one block of OCR isolated characters within the image data region, or any combination thereof.

Clause 20: The system of any of clauses 11-19, wherein the at least one processor is programmed or configured to perform image processing operations comprising at least one of the following: performing a subsampling operation on the image data; performing an image segmentation locating the at least one sensitive datum; performing an edge detection operation on the image data containing the at least one sensitive datum; performing at least one operation that bounds the at least one sensitive datum; performing at least one face detection operation on the image data; performing at least one OCR operation on the image data; performing at least one blurring operation on the image data containing the at least one sensitive datum; performing a at least one masking operation on the image data containing the at least one sensitive datum; performing at least one pixelation operation on the image data containing the at least one sensitive datum; performing at least on image generation and/or output operation; or any combination thereof.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only. They are not intended as a definition of the limits of means for obfuscating sensitive data.

BRIEF DESCRIPTION OF THE DRAWINGS

Additional advantages and details of the means for obfuscating sensitive data are explained in greater detail below with reference to the exemplary embodiments or aspects that are illustrated in the accompanying drawings. In the drawings.

DETAILED DESCRIPTION

Figure 1:
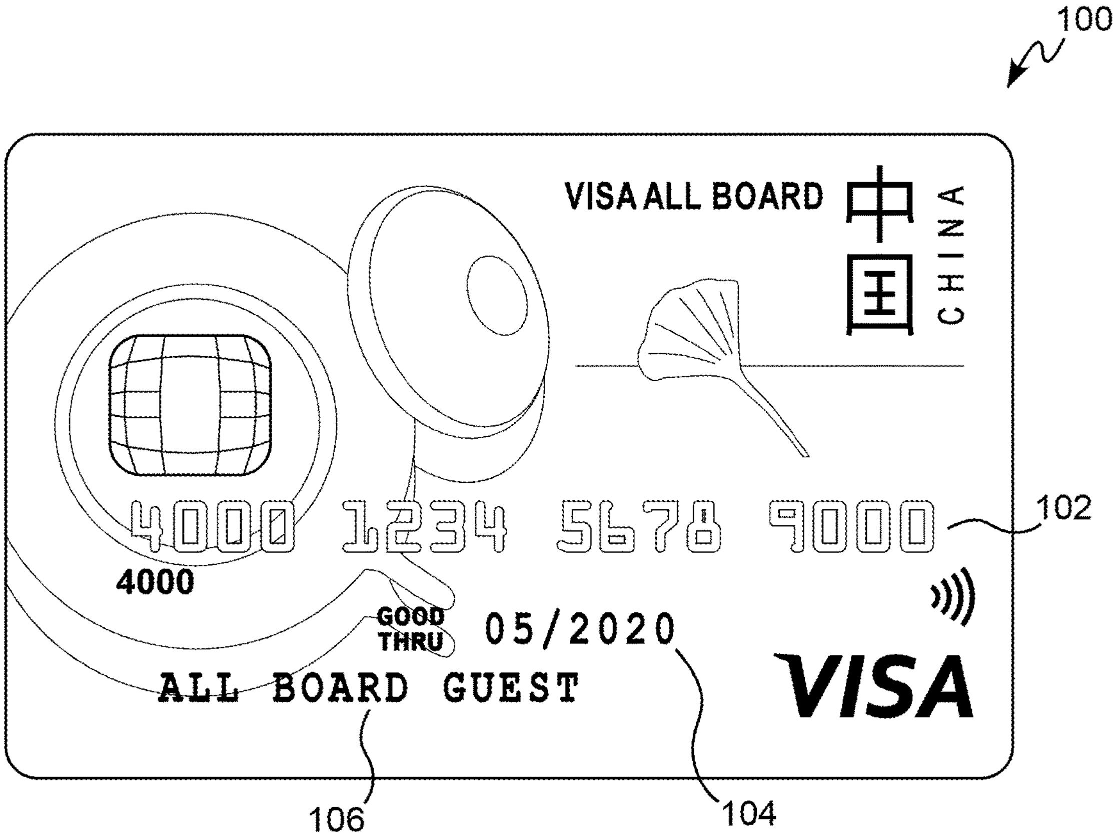
FIG. 1 is a surface view of a representative credential according to non-limiting embodiments or aspects of the present disclosure.

Spatial or directional terms, such as "left", "right", "inner", "outer", "above", "below", and the like, are not to be considered as limiting as the means for obfuscating sensitive data can assume various alternative orientations. For purposes of the description hereinafter, the terms "end," "upper," "lower," "right," "left," "vertical," "horizontal," "top," "bottom," "lateral," "longitudinal," and derivatives thereof shall relate to the means for obfuscating sensitive data as it is oriented in the drawing figures. As used in the specification and the claims, the singular form of "a," "an," and "the" include plural referents unless the context clearly dictates otherwise. The terms "first", "second", and the like are not intended to refer to any particular order or chronology, but instead refer to different conditions, properties, or elements. Further, it should be understood that an order of operations or processes may vary and that some operations and/or processes may be omitted or combined in any order or be performed in parallel. By "at least" is meant "greater than or equal to". By "not greater than" is meant "less than or equal to". The term "includes" is synonymous with "comprises".

As used herein, the terms "communication" and "communicate" refer to the receipt or transfer of one or more images, alphanumerics, signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. In some non-limiting embodiments or aspects, a first unit may be in communication with a second unit even though the first unit passively receives data and does not actively transmit data to the second unit. In other non-limiting embodiments or aspects, a first unit may be in communication with a second unit if an intermediary unit processes data from one unit and transmits processed data to the second unit. It will be appreciated that numerous other arrangements are possible.

As used herein, the term "credential" refers to any document in physical or digital form that may serve to prove a user's identity. Representative examples may include a payment device, a driver's license, a passport, a security document, a government-issued document, an identification document, or any like document or any combination thereof.

As used herein, the term "processing platform" may refer to one or more processors integrated into a mobile device, a standalone device or a remote externally networked or cloud-based system and any combination thereof.

As used herein, the term "image processor" may refer to any combination of an image generation device, a camera, a scanning device, a laser sensor, an image sensor that may be a component of a client device, a mobile device, a tablet device, a desktop computer, an ATM, a kiosk, an image copier, or any like platform equipped with an image capture and generation apparatus or system.

As used herein, the term "interaction" refers to an activity or process that requires an individual to communicate or present sensitive credential information for authorization, authentication, or acceptance purposes where an image of the credential may be made and retained. Representative interactions may include, but not be limited to, merchant and peer-to-peer payments, money transfers, international airline ticketing, depositing and withdrawing cash from an ATM, application processing.

As used herein, the term "server" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, e.g., point-of-sale devices, directly or indirectly communicating in the network environment may constitute a "system," such as a merchant's point-of-sale system. Reference to "a server" or "a processor," as used herein, may refer to a previously recited server and/or processor that are recited as performing a previous step or function, a different server and/or processor, and/or a combination of servers and/or processors. In some non-limiting embodiments or aspects, as used in the specification and the claims, a first server and/or a first processor that is recited as performing a first step or function may refer to the same or different server and/or a processor recited as performing a second step or function.

As used herein, the term "mobile device" may refer to one or more portable electronic devices configured to communicate with one or more networks. In some non-limiting embodiments or aspects, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The term "client device," as used herein, refers to any electronic device that is configured to communicate with one or more servers or remote devices and/or systems. A client device may include a mobile device, a network-enabled appliance (e.g., an ATM, a kiosk, a network-enabled television, refrigerator, thermostat, and/or the like), a computer, a point of sale (POS) system, and/or any other device or system capable of communicating with a network.

It is to be understood that the specific devices and processes illustrated in the attached drawings, and described in the following specification, are simply exemplary embodiments or aspects of the means for obfuscating sensitive data. Hence, specific physical characteristics related to the embodiments or aspects disclosed herein are not to be considered as limiting.

Non-limiting embodiments or aspects of the present means for obfuscating sensitive data may allow for obfuscating information appearing in a credential that is considered sensitive by an appropriate body or authority. As used herein, the term "sensitive datum (or data)" includes any data capable of uniquely identifying an individual. A notable example may be Personally Identifiable Information (PII) information, information that potentially may be uniquely tied to, and thereby identify, a specific individual. Examples of PII include a person's photo, a person's name or names, a social security number (full or truncated), a driver's license or other government identification number, bank and benefits account numbers, a birth date or place of birth, a home and/or personal telephone number or any combination thereof. The term may also include representative example from the payments industry, variously known as Personal Accountholder Information or Public Account Information (PAI). PAI includes some of the same PII identifiers, but also, card expiration dates, card verification values, and track data, among others, or any combination thereof. Finally, a credential may include any combination of PII and PAI data.

Heretofore PII and PAI, while visible, would not be voluntarily exposed to image capture during an interaction, but as means of making payments and interactions evolved this is no longer necessarily the case. The ever evolving advent of client devices with advanced image capture and generation capabilities used, for example, in face-to-face, web-based or kiosk-based interactions introduces risks in acceptance applications that rely on the capturing or displaying a credential's image as part of processing an interaction. Images of the credentials may be stored in a device or server memory or gleaned by a fraudster standing in the background when an interaction occurs. To mitigate this risk image processing technologies may be employed so that the types of sensitive information described above may be obfuscated so that if it is stored, imaged and/or displayed, it is no longer machine or human readable In such non-limiting embodiments or aspects, a digital representation of the credential may be captured using an image capture device, such as a camera. The digital representation of the credential may be processed to determine the presence or non-presence of at least one sensitive datum. If present, the at least one sensitive datum may be obfuscated selectively, thereby providing enhanced security over what exists for image-enabled interactions. The digital representation is not to be confused with the same credential's at least one sensitive datum (for example, an account number, identity alphanumeric, token, bar code or QR code), that otherwise may be encoded magnetically or digitally within a credential and encrypted, displayed, stored, and/or transferred securely electronically and/or wirelessly in order to conduct the interaction.

Credential

Referring now to FIG. 1, the top surface of a credential 100 is shown in accordance with a non-limiting embodiment or aspect. The credential 100 may have alphanumeric or photographic information about the user. The identification document 100 may be of any size and shape and exist in both physical and digital form factors. In some non-limiting embodiments or aspects, the credential 100 may be a card, such as a credit card. In some non-limiting embodiments or aspects, the credential 100 may be a booklet, such as a passport. In some non-limiting embodiments or aspects, the credential 100 may be a security document, a government-issued document, an identification document, or any combination thereof. A corporation (e.g., a bank or merchant), government agency or other institution may issue the credential 100 where the issuing of the credential 100 is subject to a separate application and identity verification process.

Sensitive Information

With continued reference to FIG. 1, the credential 100 has at least one surface with at least one sensitive datum that may be imaged, visible, or both when used in an interaction. For example, the top surface of the credential 100 contains several representative examples of the at least one sensitive datum: an account number 102, an account expiration date 104 and an account holder name 106. Such sensitive data may be printed, written, embossed, debossed, stamped, stenciled, or otherwise appear on the credential 100.

System and Apparatus for Obfuscating Sensitive Information

Figure 2:
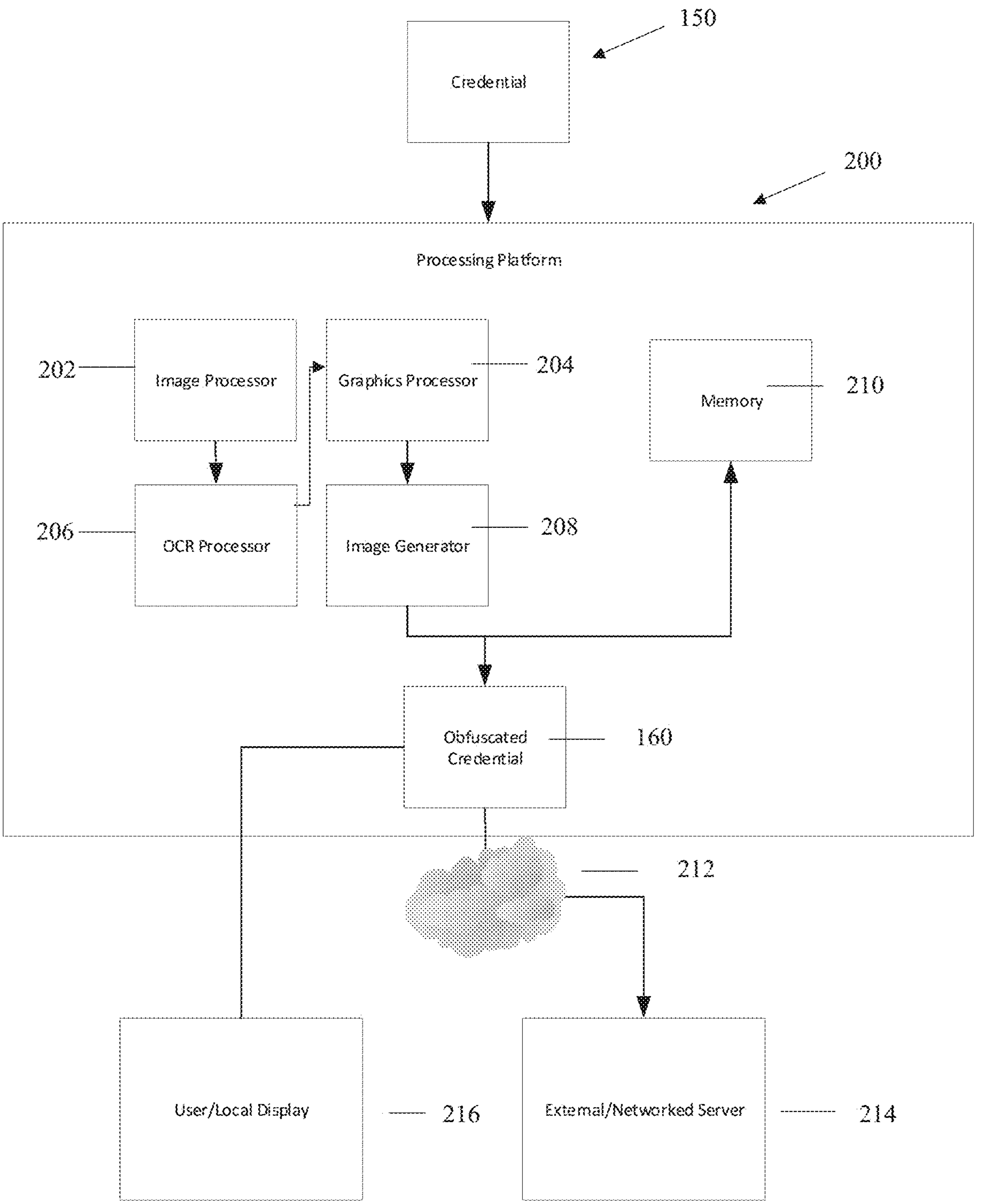
FIG. 2 is a schematic representation of a system for imaging a credential and for obfuscating sensitive data according to non-limiting embodiments or aspects of the present disclosure.

With reference to FIG. 2, a system 200 for obfuscating a credential's sensitive datum is shown according to non-limiting embodiments or aspects. A credential 150 is in communication with an external processing platform 200 that in turn may be in communication with an at least one external/networked server 214. The at least one external/network server 214 may be hosted either on a private or public network and/or via some other communication environment. The processing platform 200 may be separate and remote from the at least one external/networked server 214 or, in some non-limiting expressions or aspects, the processing platform 200 may be part of and/or coextensive with the at least one external/processing server 214.

With continued reference to FIG. 2, at least one surface containing the at least one sensitive datum of the credential 150 is exposed to a processing platform that may include and/or be in communication with any combination of processing elements, referred to in FIG. 2. These processing elements may comprise processors or generators that may be hardware or software enabled or any combination thereof. With this in mind, the processing platform may include an image processor 202, a graphics processor 204, an optical character reader processor 206, an image generator 208 and, additionally, a memory 210. The processing platform 200 may be in communication with the at least one external/networked server 214 and/or with a user/local display 216. It will be appreciated that various other arrangements may be used. While FIG. 2 shows a non-limiting communication embodiment or aspect between the processing platform 200, the user/local display 216 and the external/networked server 214 through cloud 212, other non-limiting embodiments or aspects of the communications may include mobile, web, hardwired communications, or any combination thereof. In some non-limiting embodiments or aspects, the processors 202, 204 and 206, graphics generator 208 and the memory 210, may be integrated with a mobile device, such as a smartphone or wearable device. In some non-limiting embodiments or aspects, they may be integrated in a kiosk, copy machine, ATM, laptop or desktop computer or other apparatus capable of image capture, processing and storage.

The image processor 202 in any of the host processing platforms may include an integrated camera. Similarly, the image generator 208 may be integrated or in communications with the memory 210 in which an obfuscated credential image 160 of the credential 150 may be stored, as well as with the user/local display 216 on which the obfuscated credential image 160 of the credential 150 may be displayed. The obfuscated credential image 160 may be the output of the obfuscation operation described below.

Still referring to FIG. 2, in some non-limiting embodiments or aspects, a user presents their credential 150 to the processing the image processor 202 of the processing platform 200. As used herein, the term "present" refers to the fact that the user will place or display the at least one surface of the credential containing the at least one sensitive datum in front of the image processor 202 so that an image of the credential 150's at least one surface is communicated to the image processor 202 where it is captured as a digitized representation of the at least one surface of the credential 150 in a format suitable for further processing. The digitized representation, hereafter referred to as "image data," may be formatted as one or more strings of binary, alphanumeric, hexadecimal, and/or other data representations. It will be appreciated that the image data may be arranged in any manner and/or type of data structure or format.

In some non-limiting embodiments or aspects, the image data undergoes subsequent image processing operations. As discussed herein, the image processing operations may include at least one of the following: at least one of the following: One face detection operation, one character recognition operation, one edge detection operation, one obfuscation operation (which may comprise blurring, masking and/or pixelation, applied individually or in any combination thereof), or any combination thereof. The processed image is then communicated to the image generator 208, if a display of the resulting obfuscated image 160 is required, wherein the image generator 208 generates the obfuscated image 160 for communication and/or display to the user/local display 216 or to the external/networked server 214 either directly or via the cloud 212, or any combination thereof. Further, if a local record of the processed credential 150 is required, then the image generator 208 communicates the obfuscated credential 160 to the memory 210 for storage where it is retained.

In some non-limiting embodiments or aspects, and with continued reference to FIG. 2, the credential 150 may be communicated to the processing platform 200 as part of at least one of the following interactions: authenticating a user associated with the credential 150 for at least one payment interaction, storing user profile data of a user associated with the credential 150; approving an application for a user associated with the credential 150, or any combination thereof. In some non-limiting embodiments or aspects, the authentication request may be communicated to the external/network server 214 as part of at least one of the following interactions: a payment interaction, granting access to a facility, and/or granting access to a system. It will be appreciated, however, that non-limiting embodiments or aspects may be used with any interaction involving authentication and that, in further non-limiting embodiments or aspects, the credential 150 and/or a user may be authenticated without involving an interaction.

The processing platform 200, in response to capturing the credential 150 as image data, determines whether the image data has the at least one sensitive datum within it. The determination involves further image data processing which may comprise at least one of the following: determining the location of at least one photo of a face, or the location of at least one alphanumeric character, or determining at least one region occupied by the at least one alphanumeric character, or the grouping of the at least one alphanumeric character into at least one block of alphanumeric characters, or the determining and grouping at least one block of alphanumeric characters into at least one row of alphanumeric characters, or any combination thereof.

When at least one sensitive datum is determined to be within the image data, the image data undergoes the at least one obfuscation operation of the at least one sensitive datum as specified by template (for example, document structure, organization), context-dependent (for example, position/juxtaposition dependency, relational, clustering), compositional (for example, chunking, dependency tree structure), semantic (for example, case structure, associative, logical form), syntactic (for example, parsing, segmentation, tagging) rules established by the user, the application for which the credential 150 is being used, and/or the processing platform 200, or any combination thereof.

Image Processing Operations

1. Image Data Capture

As discussed herein with reference to FIG. 2, one or more image processing operations may be applied to the image data captured from the credential 150 prior to determining whether the image data has at least one sensitive datum. In some non-limiting embodiments or aspects, the image data that may be captured from the credential 150's at least one surface by imaging platform 200 may be in at least one of the following image file formats: RGB, JPEG, TIFF, GIF, or the like. The resolution of the image data that corresponds to the credential 150 is produced using the image processor 202, such as a camera of a smart mobile phone, a laptop or desktop computer, a kiosk, a copy machine, an ATM or another similarly equipped apparatus, which is more than sufficient for the detection of at least one sensitive datum.

2. Image Processing

Once the image file comprising the image data is produced, further image processing operations may occur using the image processor 202, the OCR processor 206 or the graphics processor 204, either separately or in any combination through the communication of image file to and among these components of the processing platform 200. Such processors are now readily available for portable and other platforms as individual chips or integrated into a single chipset or system-on-a-chip. Non-limiting examples of such portable device processors that are currently available include those manufactured by Apple, Qualcomm, ARM and NVIDIA, among others, and further include comparable next generation processors that may be produced. Such processors include image signal processors (ISPs); single-, dual-, quad-, and octa-core central processing units (CPUs); and graphical processing units (GPUs).

The Image processor 202 may perform initial pre-processing. Such image pre-processing may be used to correct or adjust for skew, orientation, hue, brightness, scale, or any combination thereof. It may also apply by template (for example, document structure, organization), context-dependent (for example, position/juxtaposition dependency, relational, clustering), compositional (for example, chunking, dependency tree structure), semantic (for example, case structure, associative, logical form), syntactic (for example, parsing, segmentation, tagging) rules , or any combination thereof, appropriate to the credential being processed, rules used to isolate initial image data regions that may contain at least one sensitive datum. Such rules may specify the location of the at least one sensitive datum, the type of the at least one sensitive datum (for example, a photo or an alphanumeric), the composition and/or organization of the at least one sensitive datum (for example, whether it comprises a block of contiguous alphanumerics, a row comprised of one or more blocks of alphanumerics, a region comprised on multiple blocks and/or rows of alphanumerics, the number of alphanumerics comprising a block of contiguous alphanumerics, the format of alphanumerics within a block (for example, the whether it is comprised of a certain number of numbers and/or letters and their sequencing within a block, or any combination thereof).

3. Data Extraction

The face detection and OCR processor 206 extracts the at least sensitive datum that may comprise data that is the at least one photo of a user's face, the at least one alphanumeric, or any combination thereof.

The at least one OCR operation may be used by the OCR processor to determine if and where within the image data the at least one alphanumeric that may comprise the at least one sensitive datum occurs. Operations may include OCR functions built into an Android or iOS operating system, or available OCR APIs or any of their combinations. The operations may incorporate pre-processing, character recognition and/or post-processing operations. Pre-processing operations may comprise de-skew operations; despeckle operations; binarisation; line removal; layout analysis or zoning; line, edge and corner detection; aspect ratio and scale normalization; and character isolation or segmentation, or any combination thereof. Character recognition operations may comprise pattern recognition, pattern matching or feature extraction operations and/or solutions like those found in Tesseract or Cuneiform software, or any combination thereof. Post-processing operations may be used to increase OCR accuracy by employing a dictionary of the at least one of the sensitive datum that may occur within a credential and/or application-oriented OCR or customized-OCR and/or field-level OCR strategies that help constrain and interpret the characters that are recognized, or any combination thereof. Such strategies have been shown to be applicable to ID cards, driver licenses and other non-limiting embodiments or aspects of credentials.

The at least one face detection operation may be used to determine if the image data has at least one photo of a user. These operations include, but are not limited to, such operations as the Viola-Jones face detector (which uses feature detection and detector cascade processing and has proven effective for the real-time detection of faces seen from the front - as they typically may appear on credentials), the commercially available ROC One algorithm (which may run on laptops and mobile devices), and such advances therefrom as may be used in boosting-based face detection schemes and Haar feature extraction and/or may extend to deep convolutional neural network solutions, such as the Deep Dense Face Detector, as the real-time processing technology advances.

Once the at least one sensitive datum is extracted within the image data, line and/or corner detection operations may be used to bound the image data regions within which it occurs and to which at least one obfuscation operation may be applied.

To better describe and illustrate the at least one obfuscation operation used to obfuscate the at least one sensitive datum, the sections that follow use the credential 100 shown in FIG. 1 as a non-limiting embodiment or aspect of the representative credential 150 shown in FIG. 2. Insofar as the credential 100 does not contain a photo of a user, note that if a photo did occur, the at least one face detection operation described above may be use by the face detection and OCR processor 206 to detect it, after which the at least one obfuscation operation described below may be applied.

Non-limiting representative obfuscation operations may be applied to at least one bounded image data region within the image data. The at least one obfuscation operation may comprise blurring, masking or pixelation. They may be applied singly or in any combination. They are described in the sections that follow and illustrated in FIG. 3, FIG. 4, and FIGS. 5A-5C, respectively.

4. Blurring

Blurring spreads and mixes an image datum (hereafter, referred to as a pixel) within the at least one bounded region with pixels within its vicinity using at least one convolution process. The at least one convolution process may be a box blur, a Gaussian blur, spin and/or zoom blurs, a Fourier transform, or any combination thereof.

Figure 3A:
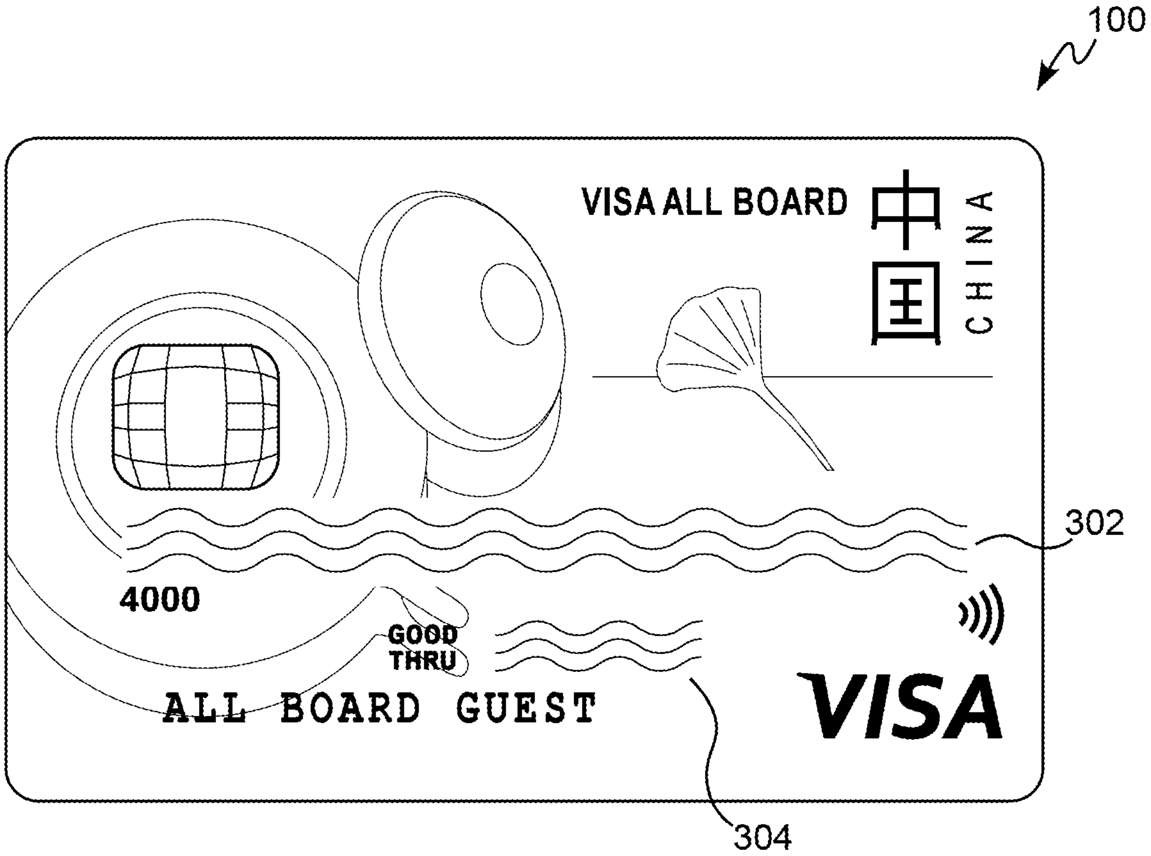
FIG. 3A is a surface view, non-limiting depiction of an original credential to which blurring has been applied to obfuscate certain rows of sensitive information according to non-limiting embodiments or aspects of the present disclosure.
Figure 3B:
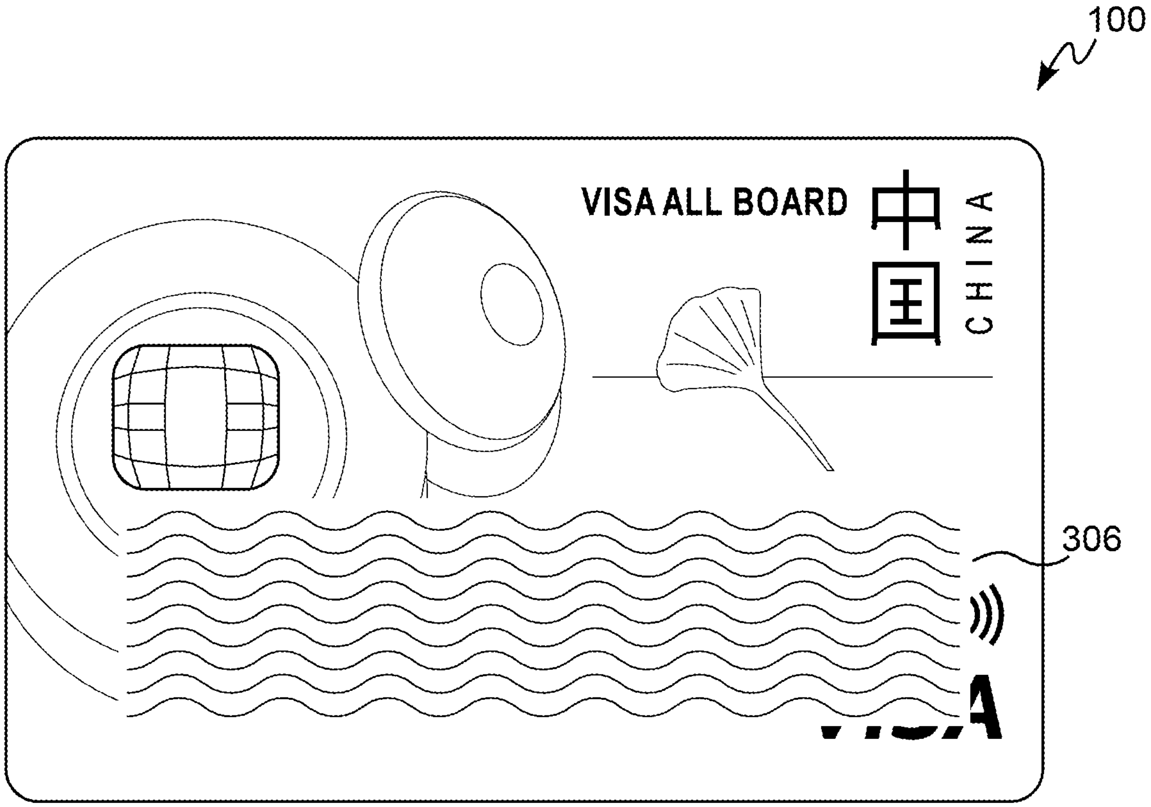
FIG. 3B is a surface view, non-limiting depiction of an original credential to which blurring has been applied to obfuscate all rows of sensitive information according to non-limiting embodiments or aspects of the present disclosure.
Figure 3C:
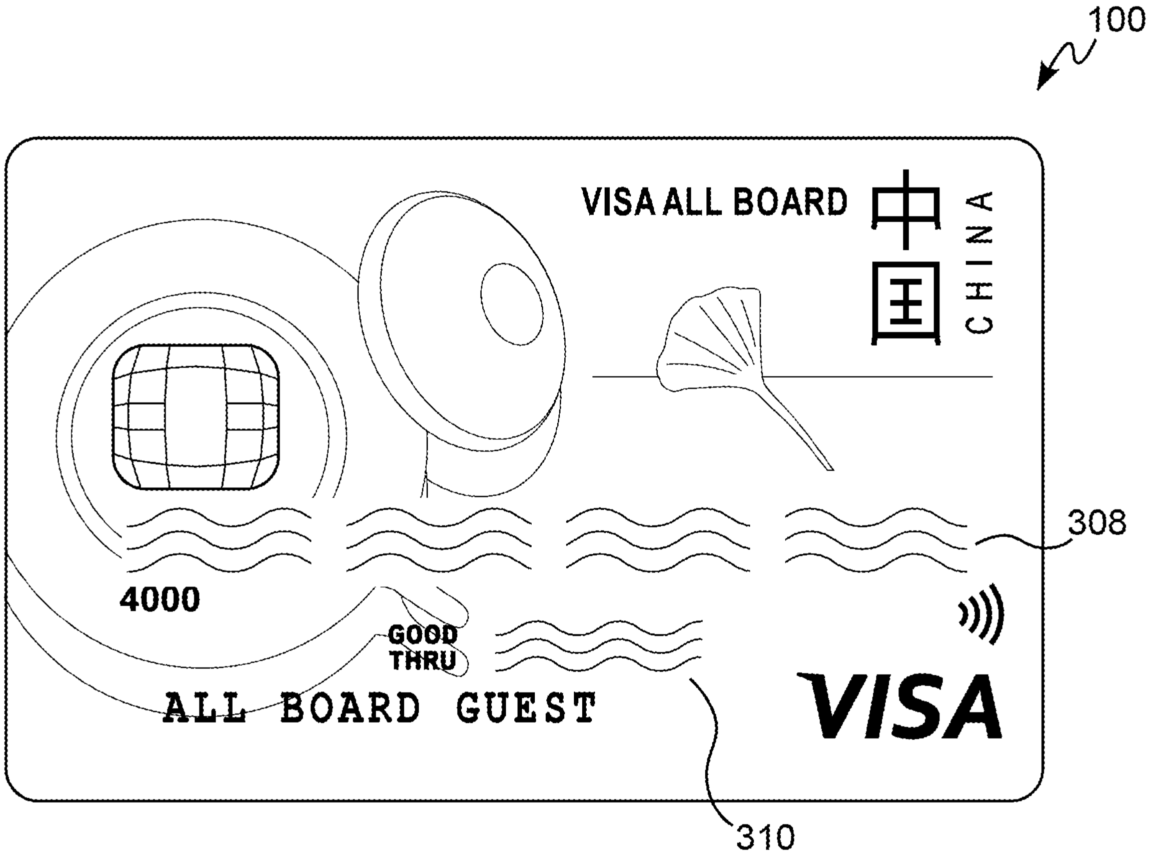
FIG. 3C is a surface view, non-limiting depiction of an original credential to which blurring has been applied to obfuscate certain blocks of sensitive information according to non-limiting embodiments or aspects of the present disclosure.

FIG. 3 illustrates non-limiting examples of blurring applied to the at least one bounded region of the at least one specific sensitive datum of credential 100. The wavy lines in FIGS. 3A, 3B, and 3C represent blurred regions of text, images, and/or other subject matter in those regions. FIG. 3A represents a non-limiting application of blurring applied separately to at least two bounded regions associated with at least two sensitive datum, a user's account number and the credential's expiration date. Relatedly FIG. 3B represents a non-limiting application of blurring to at least three bounded regions of image data associated at least three sensitive datum, a user's account number, a credential's expiration date and a user's name. In this non-limiting illustration, the bounded regions for these sensitive data are combined and blurred as one region within the image data. Finally, FIG. 3C represents a non-limiting third application of blurring wherein four bounded regions of image data comprising a user's account number (four blocks of four numbers each) and a block of image data region containing the credential's expiration date are separately blurred. Note that it is recognized that the illustrated applications of blurring in FIG. 3A, B and C are non-limiting. A user and/or application associated with the use of a credential may predefine what at least one sensitive datum should be blurred and how the at least one bounded region bounding the at least one sensitive datum should be combined to be blurred.

5. Masking

A mask applied to pixels within a bounded region outputs an image of the same size but which, conceptually, is placed on top of the original image. The value of an output pixel is computed from its initial value and the values of pixels within its vicinity. Mask processing may comprise at least one operation involving convolution correlation, normalization, low-pass filtering, high-pass filtering, Gaussian filtering, median filter processing or any combination thereof.

FIG. 4 illustrates non-limiting examples of a layered mask, one in which at least one opaque mask is overlaid on at least one bounded region of the at least one sensitive datum of credential 100. The mask in this case appears arbitrarily in FIG. 4 as a white region overlaid on an image data region within which the pixels of the at least one bounded region of the at least one sensitive datum occurs. The color or pattern of the mask may be defined by a user or by an application associated with the use of a credential.

Figure 4A:
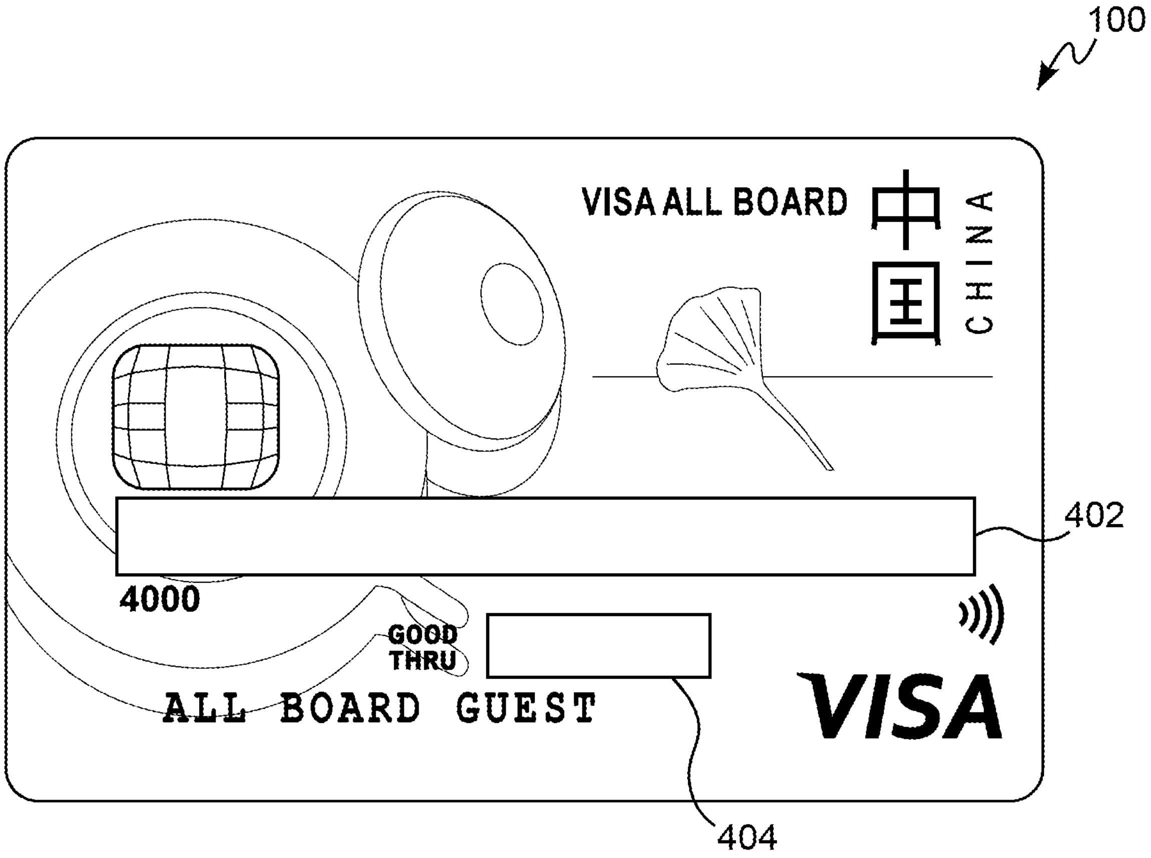
FIG. 4A is a surface view, non-limiting depiction of an original credential to which masking has been applied to obfuscate certain rows of sensitive information according to non-limiting embodiments or aspects of the present disclosure.
Figure 4B:
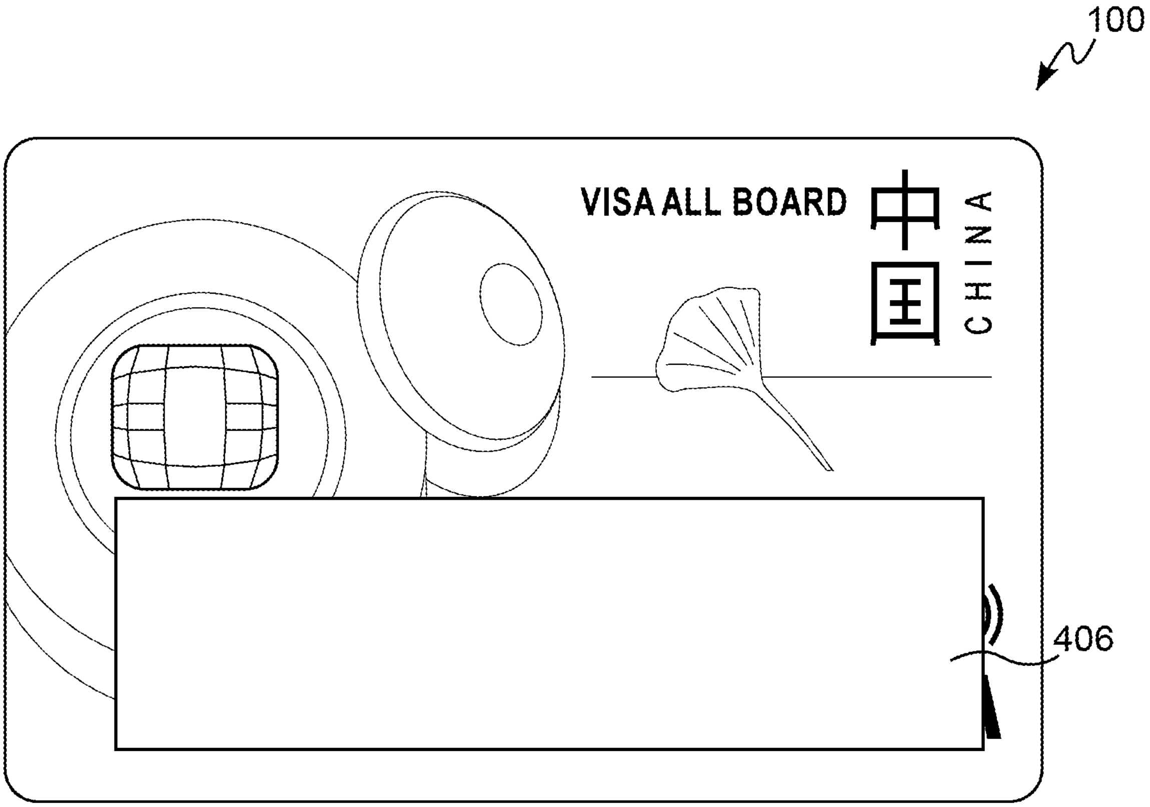
FIG. 4B is a surface view, non-limiting depiction of an original credential to which masking has been applied to obfuscate all rows of sensitive information according to non-limiting embodiments or aspects of the present disclosure.
Figure 4C:
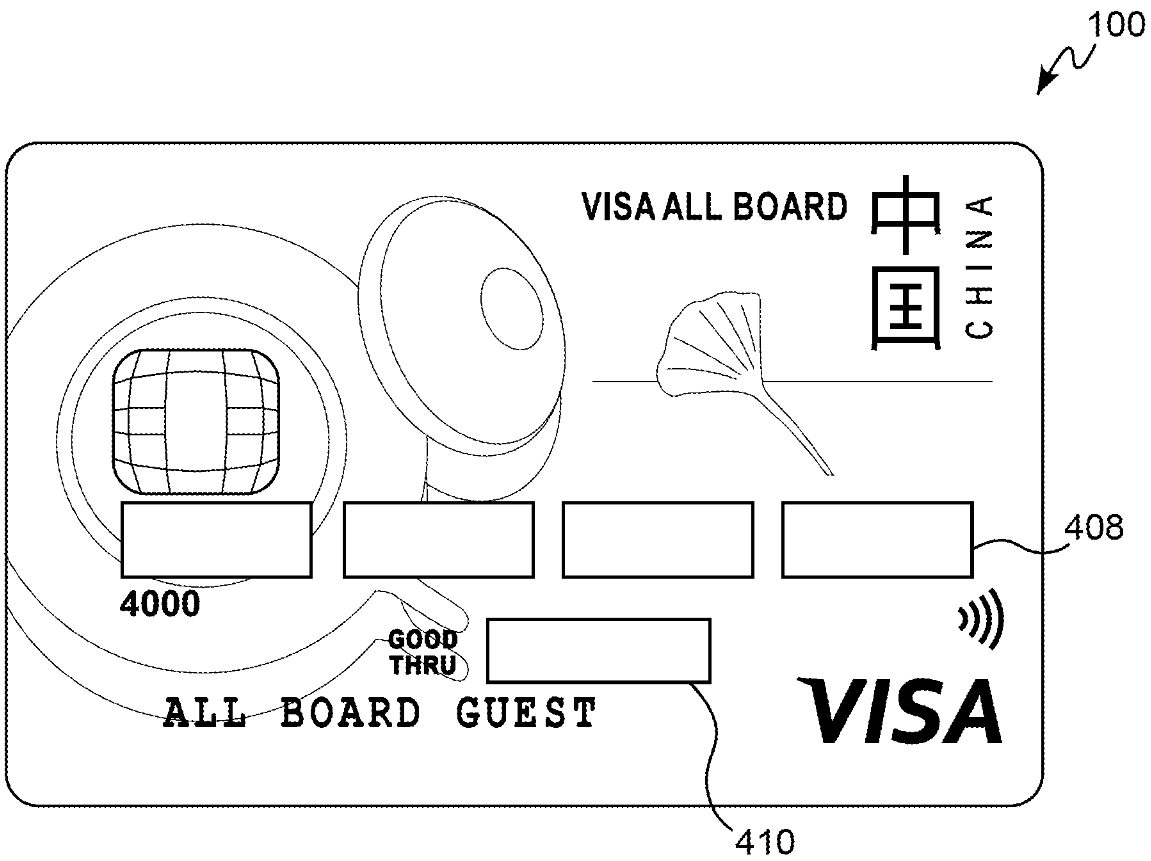
FIG. 4C is a surface view, non-limiting depiction of an original credential to which masking has been applied to obfuscate certain blocks of sensitive information according to non-limiting embodiments or aspects of the present disclosure.

FIG. 4 illustrates non-limiting examples of masking applied to the at least one bounded region of the at least one specific sensitive datum of credential 100. FIG. 4A represents a non-limiting application of masking applied separately to at least two bounded regions associated with at least two sensitive datum, a user's account number and the credential's expiration date. Relatedly FIG. 4B represents a non-limiting application of masking to at least three bounded regions of image data associated at least three sensitive datum, a user's account number, a credential's expiration date and a user's name. In this non-limiting illustration, the bounded regions for these sensitive data are combined and masked as one region within the image data. Finally, FIG. 4C represents a non-limiting third application of masking wherein four bounded regions of image data comprising a user's account number (four blocks of four numbers each) and a block of image data region containing the credential's expiration date are separately masked. Note that it is recognized that the illustrated applications of masking in FIG. 4A, B and C are non-limiting. A user and/or application associated with the use of a credential may predefine what at least one sensitive datum should be masked and how the at least one bounded region bounding the at least one sensitive datum should be combined to be masked.

6. Pixelation

Pixelation reduces the resolution of a digital image by replacing groups of pixels having different values with values that are the same so that the result appears as a larger pixel that is visible to a viewer. Often, but not necessarily, the pixelated pixel is defined in terms of the minimum, maximum or average value of the original pixels in the group of pixels that are being pixelated. The at least one of the operations used to achieve pixilation effects may comprise bitmap manipulations, vector graphics, procedural textures (e.g., fractals), scaled geometric models, sampling with a step function, interpolation between a linear and step function or any combination thereof.

Figure 5A:
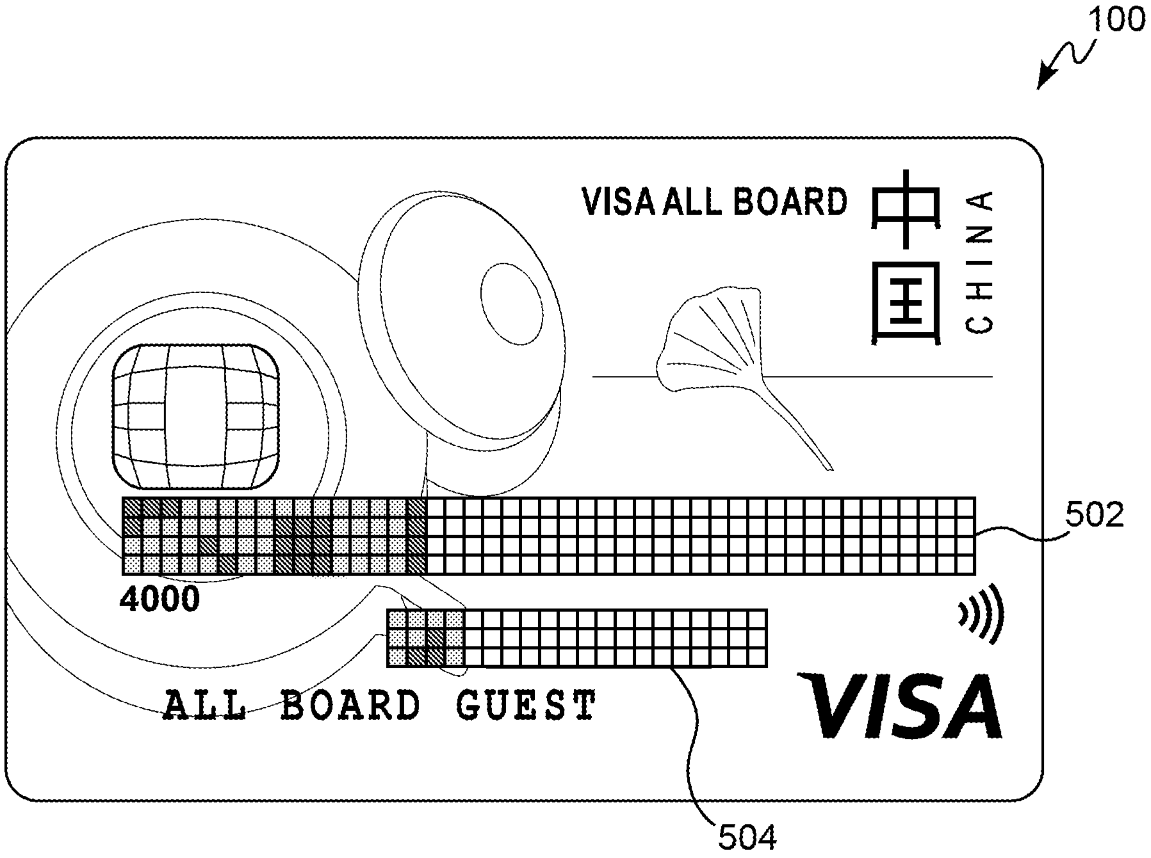
FIG. 5A is a surface view, non-limiting depiction of an original credential to which pixelation has been applied to obfuscate certain rows of sensitive information according to non-limiting embodiments or aspects of the present disclosure.
Figure 5B:
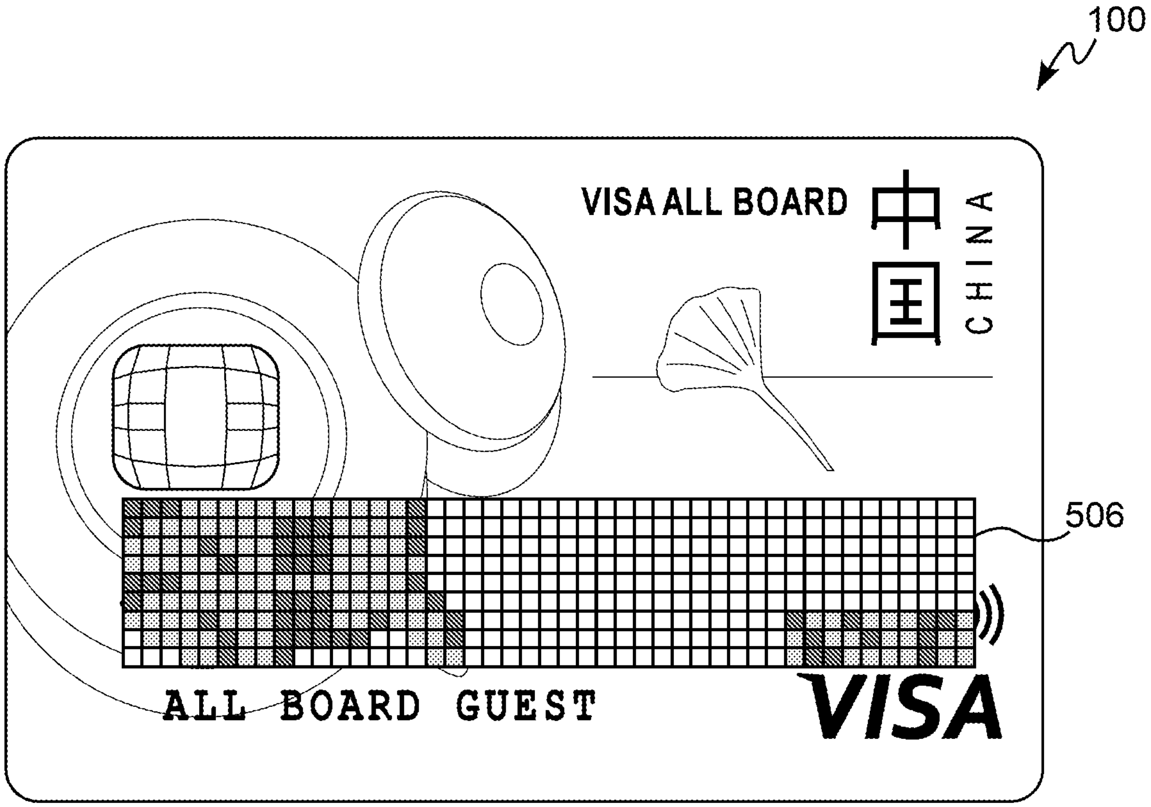
FIG. 5B is a surface view, non-limiting depiction of an original credential to which pixelation has been applied to obfuscate all rows of sensitive information according to non-limiting embodiments or aspects of the present disclosure.
Figure 5C:
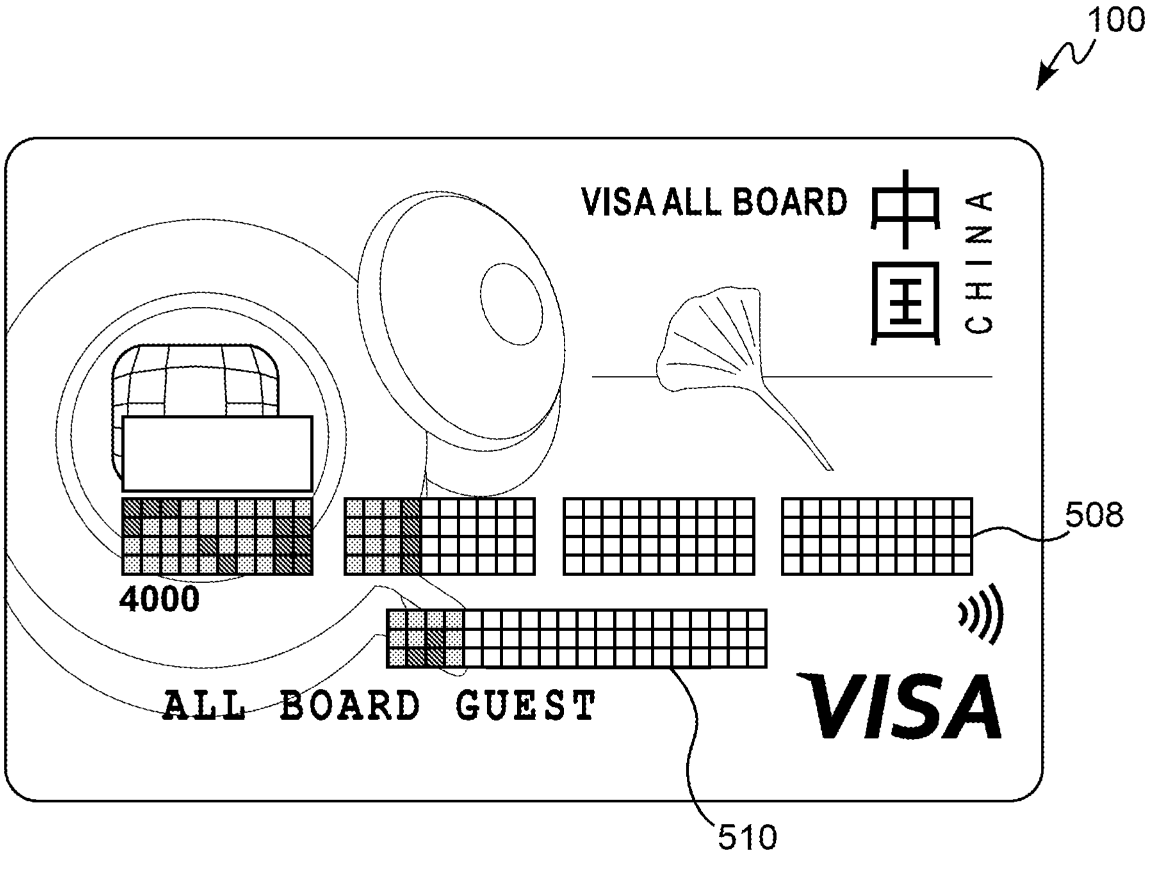
FIG. 5C is a top view, on-limiting depiction of an original credential to which pixelation has been applied to obfuscate certain blocks of sensitive information according to non-limiting embodiments or aspects of the present disclosure

FIG. 5 illustrates non-limiting examples of pixelation applied to the at least one bounded region of the at least one specific sensitive datum of credential 100. FIG. 5A represents a non-limiting application of pixelation applied separately to at least two bounded regions associated with at least two sensitive datum, a user's account number and the credential's expiration date. Relatedly FIG. 5B represents a non-limiting application of pixelation to at least three bounded regions of image data associated at least three sensitive datum, a user's account number, a credential's expiration date and a user's name. In this non-limiting illustration, the bounded regions for these sensitive data are combined and pixelated as one region within the image data. Finally, FIG. 5C represents a non-limiting third application of pixelation wherein four bounded regions of image data comprising a user's account number (four blocks of four numbers each) and a block of image data region containing the credential's expiration date are separately pixelated. Note that it is recognized that the illustrated applications of pixelation in FIG. 5A, B and C are non-limiting. A user and/or application associated with the use of a credential may predefine what at least one sensitive datum should be blurred and how the at least one bounded region bounding the at least one sensitive datum should be combined to be pixelated.

Method of Authenticating an Identification Document

Figure 6:
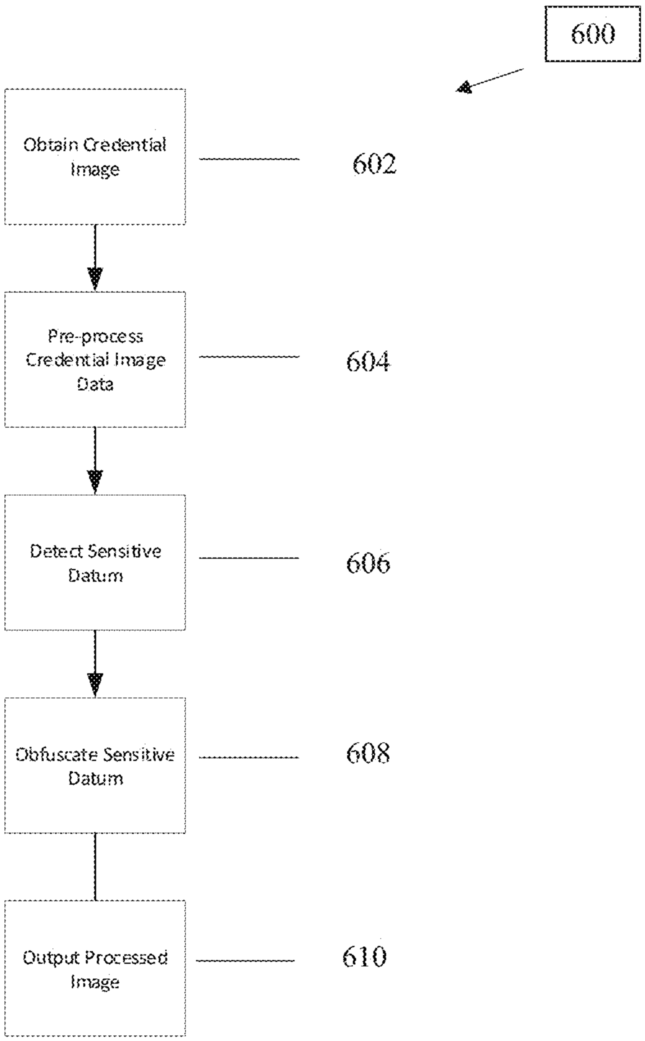
FIG. 6 is a flow diagram for non-limiting embodiments or aspects of a method for obfuscating the at least one sensitive datum.

Referring now to FIG. 6, the figure shows a flow diagram for non-limiting embodiments or aspects of a method for obfuscating the at least one sensitive datum. Prior to initiating an obfuscation operation, as part of an interaction or non- interaction, a user may be prompted to present the at least one surface of a credential containing the at least one sensitive datum, for example, as when the user makes a payment, obtains an airplane ticket or opens an account. When prompted the user may present the at least one surface containing the at least one sensitive datum of a credential to be captured, such a top or bottom surface of a payment card or a driver's license or one or more pages of a passport. The user positions the at least one surface before a processing platform 200 so that an image of the at least one surface may to be processed to obfuscate the at least one sensitive datum in the event that an image of the at least one surface is output for a communication, for display or for storage by the processing platform 200.

The obfuscation operation 600 begins with step 602 obtaining the image data associated with the at least one surface the credential containing the sensitive datum. It uses the image processor 202 to do so.

The image data, now hosted in the image processor 202, may be pre-processed to make it suitable for the application of the at least one face detection, the at least one OCR operation, or any combination thereof. Pre-processing occurs at step 604. It may comprise correcting for skew, orientation, hue, brightness, scale, or any combination thereof. It may also apply by template (for example, document structure, organization), context-dependent (for example, position/juxtaposition dependency, relational, clustering), compositional (for example, chunking, dependency tree structure), semantic (for example, case structure, associative, logical form), syntactic (for example, parsing, segmentation, tagging) rules, or any combination thereof, appropriate to the credential being processed to isolate the at least one image data region that may contain the at least one sensitive datum. The pre-processing output may be communicated to the face detection and OCR processor 206.

At step 606, the face detection and OCR processor 206 uses the at least one face detection operation or the at least one OCR operation, or any combination thereof, to detect, localize and bound the at least one image data region containing the at least one sensitive datum representing a photo of a user's face or the at least one alphanumeric comprising the at least one sensitive datum. The output of the face detection and OCR processor 206 is communicated to the graphics processor 204 for the obfuscation of the at least one bounded data image data region containing the at least one sensitive datum. If, on the other hand, the at least one sensitive datum is not detected within the image data, step 608 is bypassed and the original image space of the at least one surface of the credential is communicated directly to step 610 wherein original input image may be output to the user/local display 216, or the memory 210, or the external/network server 214 either directly or through the cloud 212, or any combination thereof.

With continued reference to FIG. 6, at step 608, graphics processor 204 applies the at least one obfuscation operation to the at least one bounded image data region containing the at least one sensitive datum. The at least one obfuscation operation may take the form of the at least one blurring operation, the at least one masking operation, or the at least one pixilation operation described previously, any other operation that achieves a comparable result whereby the at least one sensitive datum is made unreadable by a human or machine, or any combination thereof.

The pre-processed image data and the obfuscated at least one image data region containing the at least one sensitive datum are communicated to the image generator 208 wherein step 608 replaces each at least one image data region that was obfuscated with its step 608 obfuscated counterpart. The resulting obfuscated image of the at least one surface of the credential may be output in step 610 to the user/local display 216, or the memory 210, or the external/network server 214 either directly or through the cloud 212, or any combination thereof.

Although the means for obfuscating sensitive data have been described in detail for the purpose of illustration based on what is currently considered to be the most practical and preferred embodiments or aspects, it is to be understood that such detail is solely for that purpose and that the means for obfuscating sensitive data are not limited to the disclosed embodiments or aspects, but, on the contrary, is intended to cover modifications, equivalent arrangements and advancements in the technologies, processing and obfuscation operations that are within the spirit and scope of the appended claims. For example, it is to be understood that the present means for obfuscating sensitive data contemplates that, to the extent possible, one or more features of any embodiment or aspect can be combined with one or more features of any other embodiment or aspect.

The invention claimed is:

1. A computer-implemented method for obfuscating at least one sensitive datum on at least one surface of a captured credential in the course of an interaction, the method comprising:

determining, with at least one processor, whether image data associated with an interaction has the at least one sensitive datum on the at least one surface;

in response to determining that the image data has the at least one sensitive datum on the at least one surface, determining, with the at least one processor, at least one image data region occupied by the at least one sensitive datum, wherein determining the image data region occupied by the at least one sensitive datum comprises:

locating within the image data, with the at least one processor, at least one edge of the at least one sensitive datum; and connecting the at least one edge to at least one other edge, with the at least one processor, to establish at least one boundary of the at least one sensitive datum, wherein the at least one obfuscation operation is applied to the image data bounded by at least one boundary, and wherein the at least one obfuscation operation is based on an application for which the credential is being used and at least one syntactic rule specified by the user;

applying at least one obfuscation operation to the at least one image data region, wherein the at least one obfuscation operation renders the at least one sensitive datum unreadable by a human or a machine; and generating and outputting a resulting obfuscated image of the at least one surface of the credential.

2. The computer-implemented method of claim 1, further comprising applying at least one face detection operation to detect and isolate the at least one sensitive datum within the image data, wherein the image data comprises a photo of a user to be obfuscated.

3. The computer-implemented method of claim 2, wherein the at least one face detection operation comprises at least one of the following:

a Viola-Jones face detector, a ROC, a boost-based face detection scheme, a Haar feature extractor, a neural network solution, or any combination thereof.

4. The computer-implemented method of claim 1, further comprising applying at least one OCR operation to the image data to detect and isolate the at least one sensitive datum within the image data, wherein the at least one sensitive datum comprises at least one alphanumeric character.

5. The computer-implemented method of claim 4, wherein the OCR operation comprises at least one of the following: a pre-processing operation, a character recognition operation, a post-processing operation, or any combination thereof.

6. The computer-implemented method of claim 1, further comprising using an edge detection algorithm to establish the at least one edge of the at least one sensitive datum and to connect the at least one of the edges of the at least one sensitive datum to establish the at least one boundary of the at least one sensitive datum.

7. The computer-implemented method of claim 1, wherein the obfuscation operation comprises at least one of the following: blurring, masking, pixilation, or any combination thereof.

8. The computer-implemented method of claim 1, wherein the at least one image data region comprises at least one of the following: at least one photo detected within the at least one image data region, at least one block of contiguous OCR isolated characters within the image data region, at least one row comprising at least one block of OCR isolated characters within the image data region, or any combination thereof.

9. The computer-implemented method of claim 1, wherein performing the image processing operation comprises at least one of the following:

performing a subsampling operation on the image data;

performing an image segmentation locating the at least one sensitive datum;

performing an edge detection operation on the image data containing the at least one sensitive datum;

performing an operation that bounds the at least one sensitive datum;

performing at least one face detection operation on the image data;

performing at least one OCR operation on the image data;

performing at least one blurring operation on the image data containing the at least one sensitive datum;

performing at least one masking operation on the image data containing the at least one sensitive datum;

performing at least one pixelation operation on the image data containing the at least one sensitive datum;

performing at least on image generation and/or output operation; or any combination thereof.

10. A system for obfuscating at least one sensitive datum on at least one surface of a captured credential in the course of an interaction, the system comprising at least one processor, wherein the at least one processor is programmed or configured for:

determining whether image data associated with the credential has at least one sensitive datum on the at least one surface;

determining the image data region occupied by the at least one sensitive datum by locating within the image data the location of at least one edge of the at least one sensitive datum;

connecting the at least one edge comprising the perimeter of the at least one sensitive datum to establish a boundary of the at least one sensitive datum;

in response to determining that the image data has the at least one sensitive datum on the at least one surface, applying at least one obfuscation operation to the at least one sensitive datum, wherein the at least one obfuscation operation renders the at least one sensitive datum unreadable by a human or a machine, wherein the at least one obfuscation operation is based on an application for which the credential is being used and at least one syntactic rule specified by the user; and generating and outputting a resulting obfuscated image of the at least one surface of the credential.

11. The system of claim 10, wherein the at least one processor is further programmed or configured for:

applying the at least one obfuscation operation to the image data bounded by the established boundary; and generating and output a resulting obfuscated image of the at least one surface of the credential for storage, display or any combination thereof.

12. The system of claim 10, wherein the at least one processor is further programmed or configured to apply at least one face detection operation to detect and isolate the at least one sensitive datum within the image data that may be a photo of a user to be obfuscated.

13. The system of claim 12, wherein the at least one face detection operation comprises at least one of the following: Viola-Jones face detector, a ROC, a boost-based face detection scheme, a Haar feature extractor, a neural network solution, or any combination thereof.

14. The system of claim 10, wherein the at least one processor is further programmed or configured for applying at least one OCR operation to the image data to detect and isolate the at least one sensitive datum within the image data that comprises at least one alphanumeric character.

15. The system of claim 14, wherein the OCR operation comprises at least one of the following: a pre-processing operation, a character recognition operation, a post-processing operation, or any combination thereof.

16. The system of claim 10, wherein the at least one processor is programmed or configured for establishing the at least one edge of the at least one sensitive datum and to connect the at least one edge of the at least one sensitive datum to establish the at least one boundary of the at least one sensitive datum.

17. The system of claim 10, wherein the at least one processor is programmed or configured for applying at least one obfuscation operation comprising at least one of the following: blurring, masking, pixilation, or any combination thereof.

18. The system of claim 10, wherein the at least one processor is programmed or configured for isolating the at least one image data region within the image data to be obfuscated that comprises the at least one boundary within the at least one image data region that comprises the at least one photo detected within the at least one image data region, or the at least one block of contiguous OCR isolated characters within the image data region, or at least one row comprising at least one block of OCR isolated characters within the image data region, or any combination thereof.

19. The system of claim 10, wherein the at least one processor is programmed or configured to perform image processing operations comprising at least one of the following:

performing a subsampling operation on the image data;

performing an image segmentation locating the at least one sensitive datum;

performing an edge detection operation on the image data containing the at least one sensitive datum;

performing at least one operation that bounds the at least one sensitive datum;

performing at least one face detection operation on the image data;

performing at least one OCR operation on the image data;

performing at least one blurring operation on the image data containing the at least one sensitive datum;

performing a at least one masking operation on the image data containing the at least one sensitive datum;
performing at least one pixelation operation on the image data containing the at least one sensitive datum;
performing at least on image generation and/or output operation; or
any combination thereof.

* * * * *